United States Patent [19]
De Graffenreid et al.

[11] 3,759,459
[45] Sept. 18, 1973

[54] MANDREL FOR WINDING MATERIAL THEREON

[76] Inventors: Howard T. De Graffenreid, Box 261, Inola; Clifford H. May, 702 S. Muskogee St., Sapulpa, both of Okla.

[22] Filed: Jan. 10, 1972

[21] Appl. No.: 216,350

[52] U.S. Cl. .............................. 242/72.1
[51] Int. Cl. ............................... B65h 75/24
[58] Field of Search ............ 242/68, 68.2, 72, 242/72.1; 279/2

[56] References Cited
UNITED STATES PATENTS

| | | | |
|---|---|---|---|
| 3,637,156 | 6/1970 | Shepherd | 242/72.1 |
| 1,527,539 | 2/1925 | Damon | 242/72.1 |
| 2,818,264 | 12/1957 | Overstreet | 242/72 |
| 3,596,847 | 8/1971 | Peterson | 242/72 |
| 2,665,075 | 1/1954 | Baldwin | 242/72 |
| 3,253,323 | 5/1966 | Sayeressig | 242/72 B |

*Primary Examiner*—George F. Mautz
*Assistant Examiner*—Edward J. McCarthy
*Attorney*—James R. Head et al.

[57] ABSTRACT

A mandrel for use in winding filter material thereon to form a filter cartridge including a tube of rigid material of a length at least equal to the filter cartridge and a plurality of evenly spaced radially extending ribs.

3 Claims, 9 Drawing Figures

3,759,459

MANDREL FOR WINDING MATERIAL THEREON

BACKGROUND, SUMMARY AND OBJECTS OF THE INVENTION

Filter cartridges, including coalescing cartridges, are commonly manufactured by winding filter media about a center member. In filter cartridges known today the center member is typically a perforated tube of stiff material. The cartridges are wound by applying successive layers of filter media, the layers differing in characteristics according to the desired objective of the filter. The center tube is perforated and remains a part of the completed filter cartridge. The center tube being cylindrical means that the density of filter media wound thereon is the same around the entire external circumference.

This invention provides a center tube for use in winding filter media thereon to form filter cartridges wherein it is possible to obtain a variable density of the filter media. In one embodiment of the invention the mandrel is designed for a system of usage in which the mandrel becomes an integral and permanent part of the cartridge. In a second embodiment the mandrel is used in a manufacturing method in which the mandrel is withdrawn from the cartridge after it is wound for repeated reuse.

It is therefore an object of this invention to provide a mandrel for use in winding filter material thereon to form a filter cartridge.

More particularly, an object of this invention is to provide a mandrel for use in winding filter material thereon to form a filter cartridge in which the filter cartridge material has a variable density.

Another object of this invention is to provide a mandrel for use in winding filter material thereon to form a filter cartridge in which the mandrel is removable for reuse.

A still more specific object of the invention is to provide a mandrel for use in winding filter material thereon to form a filter cartridge in which the mandrel has expandable radially extending ribs, the ribs being expanded while filter material is wound thereon and collapsed when the cartridge is completed whereby the mandrel may be easily withdrawn from the completed cartridge for reuse.

These objects will be fulfilled and other objects become apparent in the following description and claims taken in conjunction with the attached drawing.

DESCRIPTION OF THE VIEWS

DETAILED DESCRIPTION

The use of mandrels for winding filter material thereon to form a filter cartridge is well known in the art. The mandrels typically are supported in a loop of a moving wide canvas belt in an arrangement wherein the pressure applied by the loop of belting to the circumference of the mandrel may be varied. As the mandrel is rotated by the belt filter material is fed to form about the mandrel circumference. Successive layers of filter material are applied until the desired diameter of the filter cartridge is reached. Layers of different material may be applied in succession to achieve the desired results of the cartridge according to the environment in which it is to be used. The type of materials and the combination of materials utilized depends upon the type of fluids in which the filters are to be used, the type and size of contaminant to be extracted, flow rates, and so forth.

Figure 5:
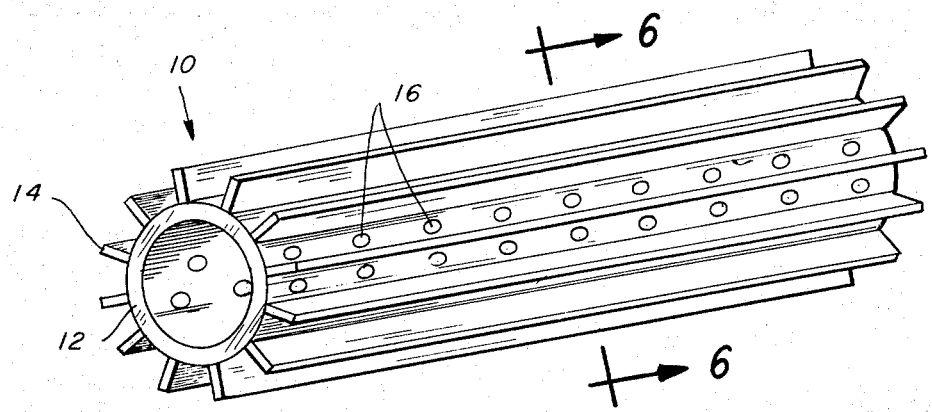
FIG. 5 is an isometric view of an integral mandrel for use in winding filter material thereon to form a cartridge wherein the mandrel becomes a permanent part of the cartridge.
Figure 6:
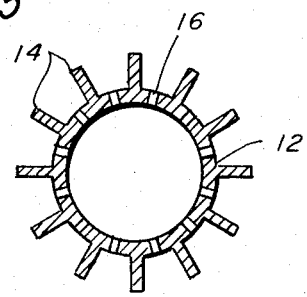
FIG. 6 is a cross-sectional view taken along the line 6—6 of FIG. 5.

As previously stated, at the present time mandrels are typically of a cylindrical exterior configuration with the filter material wound on the circumference. For such arrangement the compression applied to the filter material is consistent around the complete circumference of the tube at any given radius. This invention provides a center tube or mandrel for winding a filter cartridge in which a variable density of the filter media is obtainable. Referring to FIGS. 5 and 6, a first embodiment of the invention is shown. The mandrel, generally indicated by the numeral 10, includes a tube of rigid material 12 of a length at least equal to the length of the filter cartridge to be wound thereon. Extending from the outer circumferential surface of tube 12 is a plurality of evenly spaced radially extending ribs 14. In FIGS. 5 and 6 the ribs are longitudinal, each being in a plane of the tubular axis of tube 12. Tube 12 is perforated, the apertures 16 being between the ribs 14.

The diameter of tube 12, the radial length of ribs 14, and the spacing between the ribs are all factors which vary according to the size and application of the filter cartridge to be formed. Tube 12 is made of stiff material such as metals or plastic, the selection of the material being dependent upon the application to which the filter cartridge is to be put.

Figure 7:
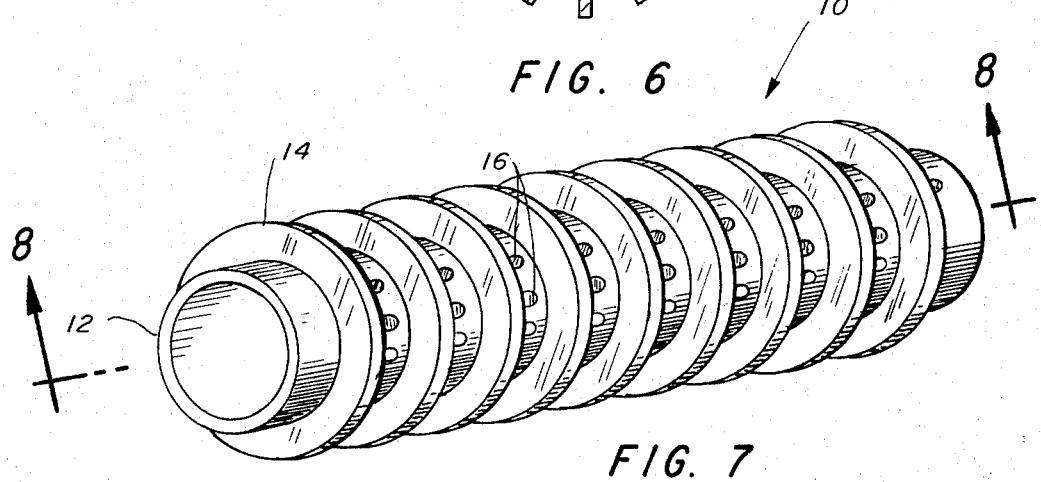
FIG. 7 is an isometric view of a portion of the mandrel of the type which becomes a permanent part of the cartridge and showing the utilization of concentric ribs.
Figure 8:
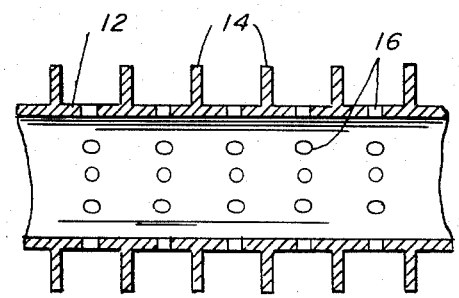
FIG. 8 is a cross-sectional view taken along the line 8-8 of FIG. 7.

FIGS. 7 and 8 show an alternate embodiment in which the ribs 14 are concentric in parallel planes perpendicular to the axis of tube 12. It can be seen that ribs 14 may be arranged in a variety of other configurations. As a specific instance, the ribs may be spiralled on the exterior of the tube 12. Any such spaced arrangement provides means wherein the density of the filter material varies as it is wound on the mandrel.

Figure 4:
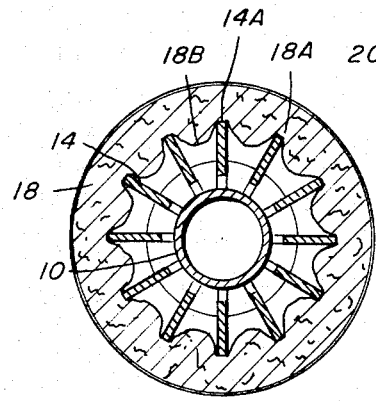
FIG. 4 is a cross-sectional view taken along the line 4—4 of FIG. 1 showing the filter material wound upon the expanded mandrel.

FIG. 4 shows the configuration taken by the filter material 18 as it is wound on a mandrel having a plurality of spaced radially extending ribs 14. The filter material 18A engaging the outer edge 14A of each rib is more densely compacted than that filter media 18B intermediate the ribs. This becomes obvious since the amount of the filter media in any radial direction from the mandrel is approximately the same. However, that which exists from the outer edge 14A of a rib 14 occupies less space than that which exists intermediate the ribs, and therefore is more compacted.

Figure 1:
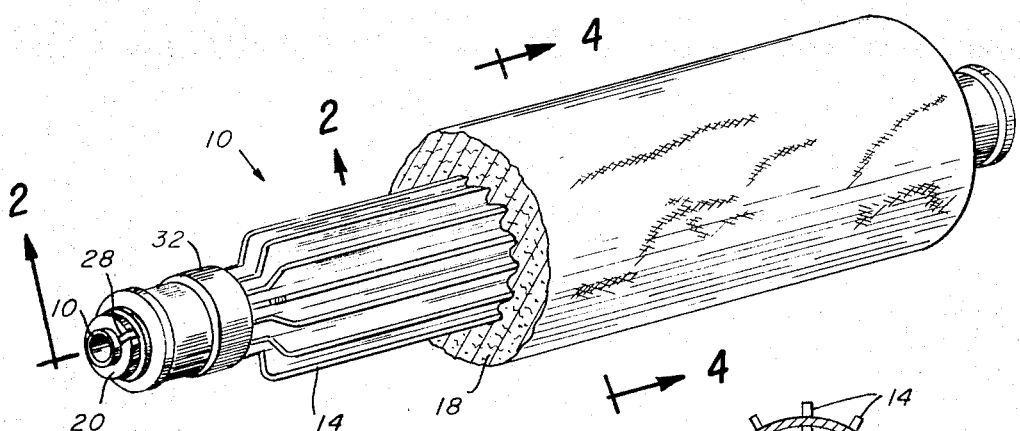
FIG. 1 is an isometric view of an embodiment of the invention in which the mandrel can be withdrawn from the completed cartridge, showing a portion of a completed cartridge wound on the mandrel.
Figure 3:
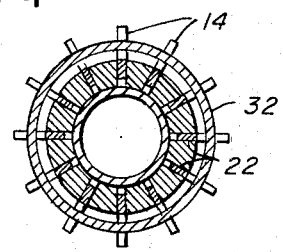
FIG. 3 is a cross-sectional view taken along the line 3—3 of FIG. 1 showing the relation of the ends of the ribs to the inner and outer sleeves.
Figure 2A:
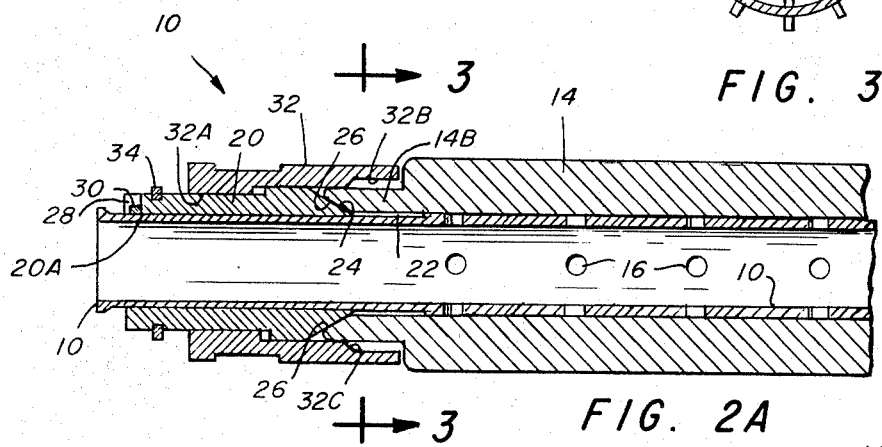
FIG. 2A is a partial cross-sectional view taken along the line 2—2 of FIG. 1 showing the mandrel in collapsed position as when it is withdrawn from the interior of a completed cartridge.
Figure 2B:
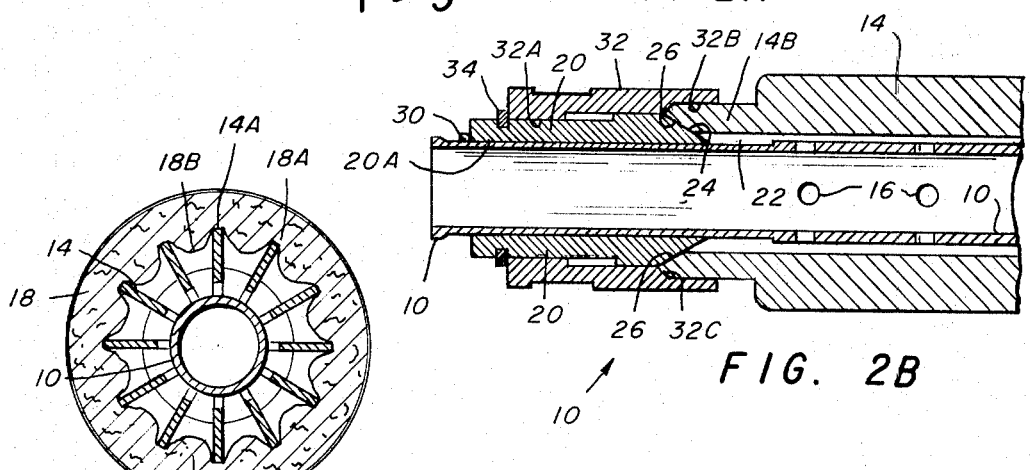
FIG. 2B is a cross-sectional view as in FIG. 2A but showing the mandrel in expanded position as when filter material is wound on the mandrel.

As previously indicated the mandrel depicting FIGS. 5-8 show an embodiment wherein the mandrel becomes a permanent part of the filter cartridge when completed. FIGS. 1-4 show an arrangement wherein a removable mandrel is provided. Tube 10 has adjacent each end thereof an inner sleeve 20, only one of which is shown. The internal diameter 20A of sleeve 20 is just slightly larger than the external diameter of tube 10 so that the sleeve 20 is slidable upon the exterior of the tube. The inner end of each inner sleeves 20 has spaced slots 22 each of which slidably receive the end portion of a rib 14. Each of the slots has a portion defining an outwardly inclined sloping surface 24. The outer end of each rib 14 has a sloping surface 26 which matches the sloping surfaces 22 of the slots. Thus, when both inner sleeves 20 are slidably positioned towards each other ribs 14 are displaced radially outwardly relative to tube 10 and correspondingly, when the inner sleeve 20 are displaced away from each other ribs 14 are free to move radially inwardly toward the tube 10. FIG. 2A shows the inner sleeves 20 moved in their positions away from each other in which the ribs 14 are positioned inwardly towards tube 10. FIG. 2B shows the arrangement wherein the inner sleeves 20 are pushed towards each other forcing the ribs 14 outwardly relative to tube 10.

Means must be provided to retain inner sleeves 20 in their inward positions towards each other so as to hold the ribs 14 outwardly. One arrangement for accomplishing this is shown. The outer end of each of the inner sleeves 20 has a retaining slot 28. A retaining boss 30 is affixed to the outer circumferential surface of tube 10 adjacent each end thereof. Slot 28 receives boss 30 so that sleeve 20 may be slid upon the tube 10. When the inner sleeve 20 is slid to the inward position as shown in FIG. 2B, radially expanding ribs 14, inner sleeve 20, may be rotated slightly so as to displace slot 28 relative to retaining boss 30. Thus each retaining boss holds the corresponding inner sleeve in inward position. When it is desired to withdraw the mandrel from the interior of a completed filter cartridge each inner sleeve 20 is rotated relative to the tube 10 to align slot 28 with retaining boss 30, allowing the inner sleeve to be slid outwardly and permitting the ribs to radially withdraw towards the tube.

Some means must be provided for retaining the ribs 14 within slots 22 in the inner sleeves 20. For this purpose an outer sleeve 32 is utilized on each end of the mandrel, one of the outer sleeves being shown in FIGS. 2A and 2B. Each outer sleeve 32 has an internal diameter 32A to receive and be slidable on the outer diameter of inner sleeves 20. Each of the ribs 14 has a reduced height portion 14B at each end thereof. This reduced height portion 14B is received within the internal circumference of outer tube 32 and thereby the ribs are prevented from being displaced out of slots 22. In the illustrated arrangement the outer sleeve 32 has an enlarged internal diameter portion 32B which joins the normal internal diameter portion 32 by an inclined or a conical surface 32C. When the inner sleeves 20 are positioned towards each other, forcing the ribs 14 outwardly as shown in FIG. 2B, each outer sleeve 32 is moved away from the other to permit the reduced diameter portions 14B of the ribs to be received in the enlarged diameter portion 32B. However, when the inner sleeves 20 are positioned away from each other to allow the ribs 14 to contract towards tube 10, each outer sleeve 32 is moved towards each other as shown in FIG. 2A to retain the ribs in their inward position. This facilitates handling the mandrel during removal from a completed cartridge. In order to retain each outer sleeve 32 upon inner sleeve 20 a key 34 is placed in a groove in the outer surface of each inner mandrel, as shown in FIGS. 2A and 2B.

METHOD OF USE

As previously indicated, mandrels are utilized between moving a looped moving belt to form a center around which filter media is wound. In the embodiments of FIGS. 5-8 the mandrel is simply placed in the belt loop and the filter material necessary to form the cartridge is fed and wound around the mandrel until a desired configuration is received. The completed assembly is removed from the belt loop, trim as necessary, and further treated in accordance with the manufacturing procedure which usually includes curing in an oven. Typically, end caps are applied to complete the cartridges. The mandrel 10 remains an integral part of the cartridge.

In the arrangement of FIGS. 1-4 the procedure is somewhat different. The mandrel sleeves 20 and 32 are positioned as shown in FIG. 2B to radially expand the ribs outwardly. The mandrel is then placed in the loop of a moving belt and the filter material fed and wound around it until the desired configuration of the filter cartridge is achieved. The cartridge having the mandrel therein is removed from the belt loop. The mandrel can then be removed from the interior of the completed cartridge by moving the sleeves to the positions shown in FIG. 2A, which serves to collapse the ribs. This permits removal of the mandrel due to the significantly reduced diameter of the rib portion contacting the interior of the wound filter media. Filter media may be used having a stiffness sufficient to retain the interior configuration imparted to it as it is wound on the mandrel. Material, as an example, includes impregnated resin in sufficient quantity and will maintain a shape after the mandrel has been removed, even prior to curing. In some applications the mandrel of FIGS. 1- 4 may be retained in its expanded position in the filter cartridge while the cartridge is curing at an elevated temperature in an oven, at which time the filter material takes its final shape before the mandrel is removed. Generally speaking, however, material used to formulate the filter cartridge will be selected such that it will retain its configuration after the mandrel is removed before curing.

Another means for utilizing the ribbed mandrel of this invention includes winding wire mesh, expanded metal or single strand wire on the mandrel before the filter material is applied. The open areas in the wire mesh or expanded metal and the space between single strand wire permits low density filter media to be forced through the openings thereof. The metal winding holds the wound filter cartridge in shape until it is cured after which the metal may be removed if desired.

It can be seen that other means can be provided for radially extending and withdrawing the spaced ribs in keeping with the concept of the invention.

While the invention has been described with a certain degree of particularity it is manifest that many changes may be made in the details of construction and the arrangement of components without departing from the spirit and scope of this disclosure. It is understood that the invention is not limited to the specific embodiments set forth herein for purposes of exemplification, but is to be limited only by the scope of the attached claim or claims, including the full range of equivalency to which each element thereof is entitled.

What is claimed is:

1. A mandrel for use in winding material thereon, comprising:
   a. a tube of rigid material;
   b. an inner sleeve positioned concentrically on said tube adjacent each end thereof, said inner sleeves each having evenly spaced radially extending slots therein, the slots in one inner sleeve being aligned with the slots in the other inner sleeve;
   c. a plurality of evenly spaced, longitudinal, radially extending ribs, said slots in said inner sleeves slidably receiving said ribs and serving as means of supporting said ribs slidably inwardly and outwardly relative to said tube; and
   d. means for holding said ribs outwardly while material is wound on said mandrel and means for withdrawing said ribs radially inwardly whereby the mandrel may be withdrawn from the material wound thereon.

2. A mandrel according to claim 1 in which said inner sleeves are slidable on said tube, in which the outer ends of said slots in said inner sleeves are tapered, and wherein the outer ends of said ribs are tapered whereby the slidable movement of said inner sleeves towards each other causes said tapered ends of said slots to engage said tapered outer ends of said ribs to displace said ribs outwardly relative to said tube; and means for of retaining said ribs in said slots.

3. A mandrel according to claim 2 including:

an outer sleeve slidably positioned on said tube adjacent the ends thereof, the outer sleeves each having an inner diameter larger than the outer diameter of said inner sleeves whereby said outer sleeves are slidably concentrically over said inner sleeves, wherein said outer sleeves each have a portion having an inner diameter to engage said ribs when said inner sleeves are positioned towards each other and said ribs are displaced outwardly and a portion having an inner diameter to engage said ribs when said inner sleeves are positioned away from each other and said ribs are displaced inwardly to thereby retain said ribs in both the inward and outward positions.

* * * * *